United States Patent [19]
Lewin et al.

[11] Patent Number: 5,185,637
[45] Date of Patent: Feb. 9, 1993

[54] PORTABLE TRAFFIC SIGNAL LIGHT PHOTOMETER

[75] Inventors: Ian Lewin; Ladd Howell, both of Scottsdale, Ariz.

[73] Assignee: Lighting Sciences, Inc., Scottsdale, Ariz.

[21] Appl. No.: 728,542

[22] Filed: Jul. 11, 1991

[51] Int. Cl.$^5$ .......................... G01J 1/42; G08G 1/097
[52] U.S. Cl. ...................... 356/218; 356/121; 356/222; 340/931
[58] Field of Search ............ 356/213, 218, 219, 220, 356/221, 222, 224, 226, 227, 229, 230, 121, 122, 153; 340/458, 583, 931

[56] References Cited

U.S. PATENT DOCUMENTS

| | | | |
|---|---|---|---|
| 2,291,114 | 7/1942 | Squyer | 356/121 |
| 3,527,540 | 9/1970 | Bowker et al. | 356/222 |
| 4,401,386 | 8/1983 | Yuasa et al. | 356/226 |
| 4,914,738 | 4/1990 | Oda et al. | 356/222 |
| 4,948,249 | 8/1990 | Hopkins et al. | 356/121 |

Primary Examiner—Richard A. Rosenberger
Assistant Examiner—Hoa Q. Pham
Attorney, Agent, or Firm—LaValle D. Ptak

[57] ABSTRACT

A portable traffic signal photometer is capable of rapidly and effectively measuring the intensity of light emanating from a traffic signal light. The photometer includes a housing member with a circular front opening for engagement with the lens of a traffic signal light. The photometer is pressed against the lens, and the light emanating from the traffic signal light is directed through an optical filter located inside the housing, which permits light from the traffic signal light emanating at a predetermined downward angle to pass through it. The light from the filter is directed onto a light-sensitive device, which produces an output signal proportional to the intensity of the light emitted by the traffic signal lens. Additional light-responsive photocells are provided to produce signals indicative of the respective color of the traffic signal light being measured by the photometer, and the composite of the color and the light intensity is used to produce a display which permits the user to determine whether the traffic signal light is properly operating within its designed specifications.

19 Claims, 3 Drawing Sheets

PORTABLE TRAFFIC SIGNAL LIGHT PHOTOMETER

BACKGROUND

Traffic signal lights are extensively used in the United States, and throughout the world, to control the flow of traffic on roadways. Although traffic signal lights are relatively simple and commonplace, they are critical for ensuring the safety of the driving public. Traffic signal lights improve highway safety and reduce congestion by providing for the orderly and predictable movement of traffic through intersections.

There are over six million individual traffic lights controlling traffic throughout the United States. It is important to ensure a proper operation, and adherence of these lights to standardized specifications The light intensity, directivity, and other specifications for traffic signal lights used in the United States have been established in standards from the Institute of Transportation Engineers (ITE). Many traffic signal lights, currently in operation, fail to meet their expected performance levels. Such failed signals frequently are not mere variations from the ITE standards specifications; but frequently are major departures from those standards.

Traffic signal lights fail to meet ITE specifications for a number of different reasons. For example, if the lamp voltage is low, the condition generally results in reduced candle power at all measurement angles. Deterioration of the reflector by distortion seriously reduces the candle power or intensity of the light emanating from the lens. Traffic signal reflectors generally are parabolic in form, and use lamps placed at or close to the parabolic focal point to produce rays in a generally parallel direction striking the lens. The lens design relies on these parallel rays to produce the final required light distribution from the signal light. If the reflector becomes distorted or diffuse, the light rays no longer are parallel, and there is a widening of the final light pattern. This causes considerable loss of candle power values near the center of distribution from the lamp.

Another reason for failure is in deterioration of the lens. When the signal lens deteriorates because of vapor etching, burning or general wear and tear, there is likely to be a reduction in the center range of the candle power values caused by diffusion of some or all of the light rays in the beam.

If the lamp is not properly located on the optical axis of the reflector by either shifting it in or out, the rays leaving the reflector, again, deviate from their normally parallel pattern. This type of shifting also affects the center high candle power values significantly. If the lamp is improperly inserted, so that it shifted to one or the other sides of the optical axis of the reflector, the filament is misaligned with the axis. This causes a sideways shifting, or a skew in the final light rays, either to the right or to the left. The result is a reduction in the candle power values emanating from the lens.

A final error resulting in failure to meet ITE specifications is improper lamp installation. For example, if a 67 Watt lamp, intended for an 8" traffic signal light, is placed into a 12" traffic signal light, rated for 150 Watt lamps, a significant degradation in performance on the low side results from the signal light. Similarly, if a 150 Watt rated lamp is placed in an 8" traffic signal light fixture, designed for a 67 Watt lamp, an excessively high value of light emanating from the fixture will initially result. This, however, can result in burning or darkening of the lens, and possible warping or deterioration of the reflector, resulting in permanent degradation of the traffic signal light.

Additional reasons exist for the failure of a traffic signal light to perform up to standards. Some of these reasons are dirt accumulation on the optical parts, such as the reflector and the lens; incorrect rotational orientation of the lens, which changes the angular direction of the light emanating from the lens; or deterioration of the optical parts, such as warping or other damage to the reflector and the like.

Typically, testing traffic signal lights for conformity with the ITE specifications cannot be done on any reasonable basis in the field, that is, at the operating location of the traffic signal light. Laboratory equipment is well known for laboratory testing traffic signal light assemblies for conformity with ITE specifications; but such equipment is bulky and requires precise alignment to the traffic signal lens for accurate and effective testing. To do this on location, at a street intersection, requires a lane closure, a platform truck, regulated power supplies, and perfect stabilization of the suspension mounted traffic signal lights. Consequently, testing of traffic signal lights after installation rarely is done.

It is desirable to provide a simple and effective device for testing installed traffic signal lights to determine the performance levels of such lights by means of a portable, easy-to-use device.

SUMMARY OF THE INVENTION

Accordingly, it is an object of this invention to provide an improved traffic signal light test device.

It is another object of this invention to provide an improved traffic signal light photometer.

It is an additional object of this invention to provide an improved portable traffic signal light photometer.

It is a further object of this invention to provide an improved lightweight, self-contained portable traffic signal light photometer for quickly and accurately sensing the signal color and intensity of traffic signal lights at the place of installation of such signal lights.

In accordance with a preferred embodiment of this invention, a traffic signal photometer for measuring the intensity of light emanating from a traffic signal light includes a housing having a front opening which engages the lens of the traffic signal light under test. Light from the traffic signal light enters the housing in which an optical filter limits the passage of light rays through the housing to those at a specified angle. Light passing through the filter is detected, and is used to produce a signal proportional to the intensity of the received light rays. Orientation switches are provided to permit output signals to be obtained from the photometer only when the photometer is oriented at predetermined angular positions with respect to the traffic signal light.

DETAILED DESCRIPTION

Figure 1:
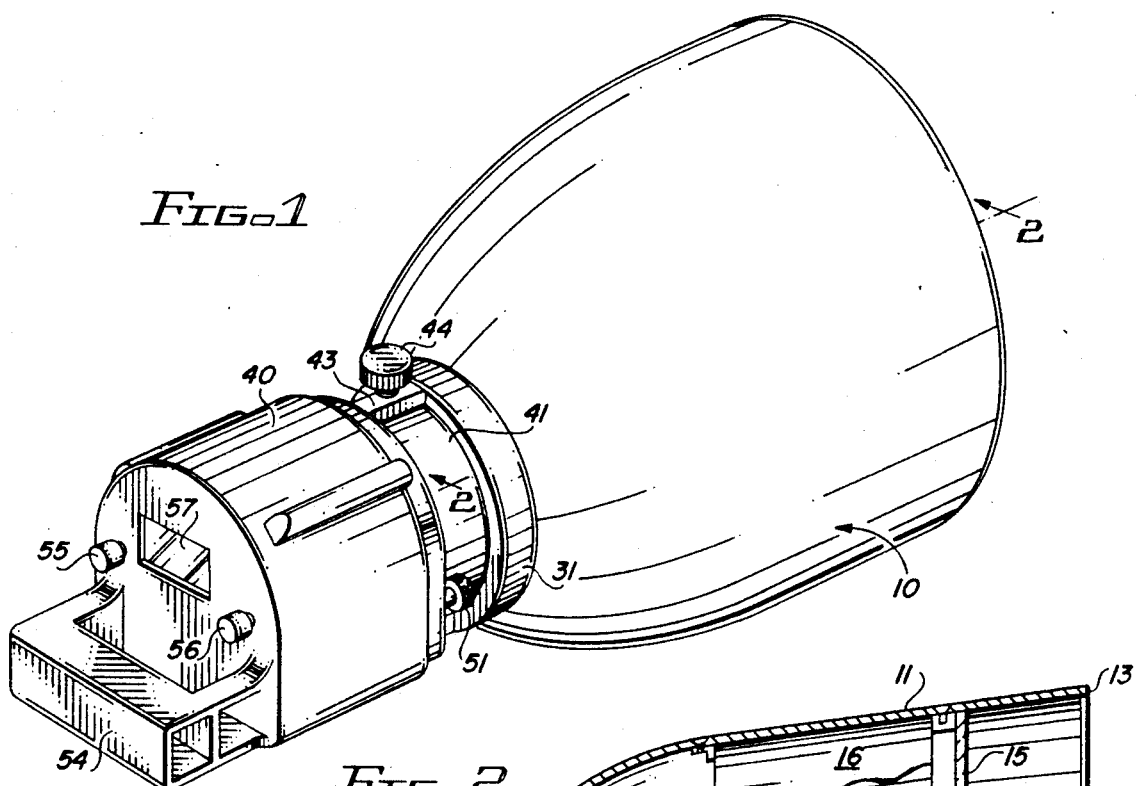
FIG. 1 is a perspective view of a preferred embodiment of the invention.

Reference now should be made to the drawings, in which the same reference numbers are used throughout the different figures to designate the same or similar components.

Typically, traffic signal lights used in the United States are mounted at relatively standard heights above the road, and are designed to direct the light emanating from the lens downward at angles including the range of 2.5° to 12.5° from a 0,0° axis. Most traffic signal lights direct the light downwardly at an angle of 7.5°, and it has been determined that the measurement of candle power values at that angle is sufficient to identify all major candle power trends. When the optical system of a traffic signal light is de focused, an overall reduction in candle power occurs. The reduction has been found to be considerable in the region of 7.5°, both horizontally and vertically. Whenever the lamp movement occurs from side to side, as discussed previously, the candle power distribution tends to shift in the opposite direction of the lamp; that is, the left and right sides of the distribution become uneven. Whenever lamp movement occurs up and down from the ideal location on the optical axis of the reflector, only the downward movement causes a major reduction in candle power. Upward movement, in some cases, causes an improvement in signal performance. Thus, it is necessary for a photometer test device to accept slightly above specification values, but which triggers a fail or alarm condition if the signal is excessively above specification. This latter circumstance also is encountered when a large wattage lamp is mistakenly installed in a traffic signal light fixture designed for a smaller wattage lamp. In all of the candle power reduction situations mentioned above, it has been found that the values clustered around the center of the light distribution are the ones most strongly affected.

The device shown in FIGS. 1 through 5 is a handheld portable traffic signal light photometer, which is capable of quickly and efficiently providing measurements to determine whether the traffic signal light is operating within the ITE specification standards. The device includes an elongated housing 10, which has a circular open front end 13 for placement over the lens of a traffic signal light. The diameter of the circular opening 13 is selected either to be 8" or 12" in accordance with the two standard diameters of traffic signal lights currently in use in the United States. The edge or circumference of the opening 13 fits directly around the outer edge of the lens of the traffic signal light. The main body of the device 10 has a uniform generally cylindrical portion terminating in a parabolic reflector 19 at the end opposite the opening 13 in the horizontal plane. In the vertical plane, shown most clearly in FIG. 2, the top 11 of the housing 10 extends downwardly from the opening 13 at an angle from horizontal, while the bottom 12 is substantially 90° or horizontal with respect to the circular opening 13. This is done to permit the housing 10 to fit beneath the outwardly extending sun shields which extend over the top of the lens in many traffic signal lights to minimize adverse effects of sunlight. The angle of the top 11 permits the housing 10 to be readily placed beneath these shields.

Figure 2:
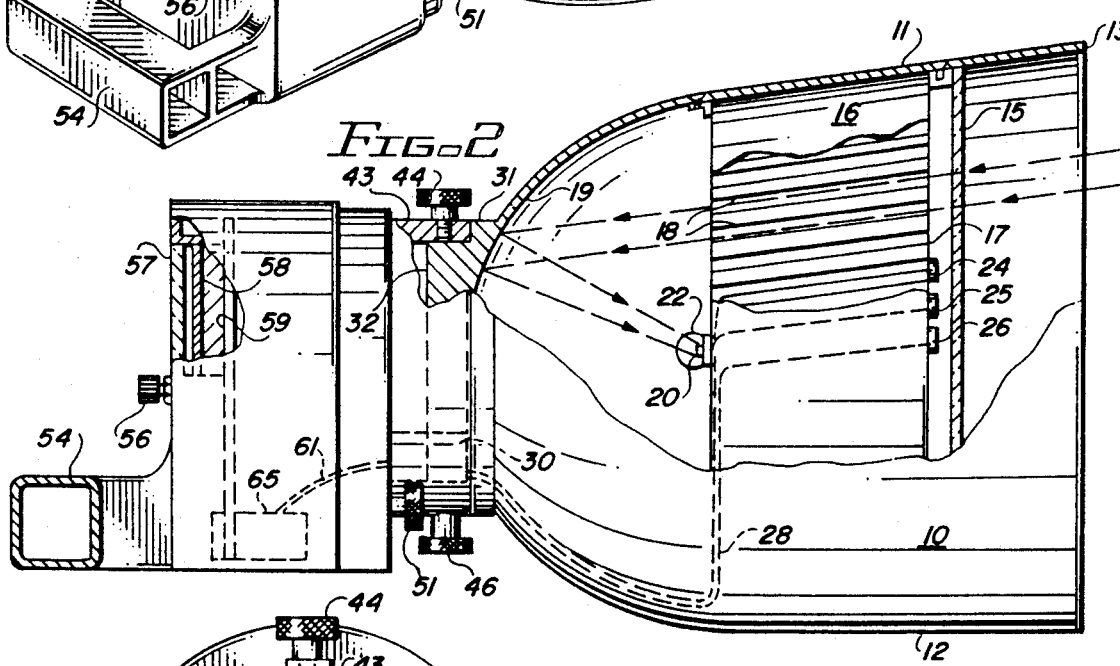
FIG. 2 is a partially cut-away side view of the embodiment of FIG. 1.
Figure 3:
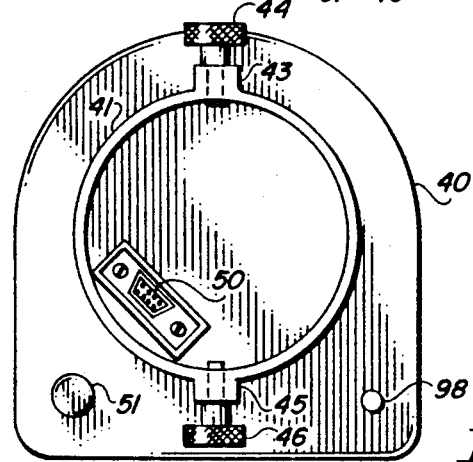
FIG. 3 is an end view of a portion of the device shown in FIGS. 1 and 2.

As shown in FIG. 2, a transparent clear glass or plastic lens 15 is provided within the housing, set back a short distance from the edge of the opening 13. The space between the lens 15 and the edge of the housing defining the circular portion 13 is sufficient to receive the convex configuration of a traffic signal light lens against which the housing 10 is placed. The lens 15 prevents dirt from entering the interior of the housing 10.

Located behind the lens 15 is an optical grid 16, physically constructed in the general shape of a honeycomb, with closely spaced parallel vertical planes 17 intersecting closely spaced parallel planes 18 oriented at a downward slope of 7.5° with respect to horizontal or the plane of the bottom 12 of the housing 10. These intersecting planes 17 and 18 provide a plurality of parallel passageways of a square cross section, each inclined downwardly 7.5° from front to back. The surfaces of the interior of the honeycomb optical filter 16 are painted flat black; so that reflection or scattering of light rays striking the surfaces is minimized. Different commercially available materials may be used, and thin aluminum or steel plates have been found to be quite satisfactory.

On the face of the honeycomb optical filter 16, directly behind the lens 15, three photocells 24, 25, and 26, are mounted as close as possible to the extension of the central axis of the circular opening 13. These photocells 24, 25, and 26 each are provided with different color filters; so that they respond, respectively, to red, yellow, and green light. For example, if the traffic signal light with which the device is being used is red, only the photocell 24 provides an signal in response to this light. This signal then is utilized in the operation of the device to trigger an appropriate comparison circuit with preset optical levels corresponding to red light. Correspondingly, the photocell 25 responds to yellow light, and the photocell 26 responds to green light to provide similar signals. An alternative color decoding arrangement using only two color sensitive cells (red and green) in conjunction with the non-colored main cell 20 also can be used. Such an arrangement also may be located adjacent the main cell 20 on the rear of the optical grid 16, viewing the reflector 19.

Light rays at the proper 7.5° downward angle from the lens of the traffic signal light being tested, pass through the optical filter or honeycomb and strike a generally circular focusing reflector 19, which directs the light rays to a main silicon photo detector or photocell 20. The surface of the reflector 19 may be painted white, or it may be a specular surface. To provide an integration of the light rays which are directed toward the main photocell 20, a translucent spherical cover 22 is provided over the photocell 20 to provide an integrated measurement from the photocell 20 which is proportional to the total light flux received on the reflector 19. Signals from the photocell 20, as well as from the selected one of the photocell detectors 24, 25, and 26, are supplied through a cable 28 to a connector socket 30 located at the rear of the housing 10, and on the outside or rear of the reflector 19, as shown most clearly in FIGS 2 and 4. The various connectors for the photocells 20, 24, 25, and 26 are connected to the connector socket 30, which is shown as a female receptacle (FIG. 4).

Figure 4:
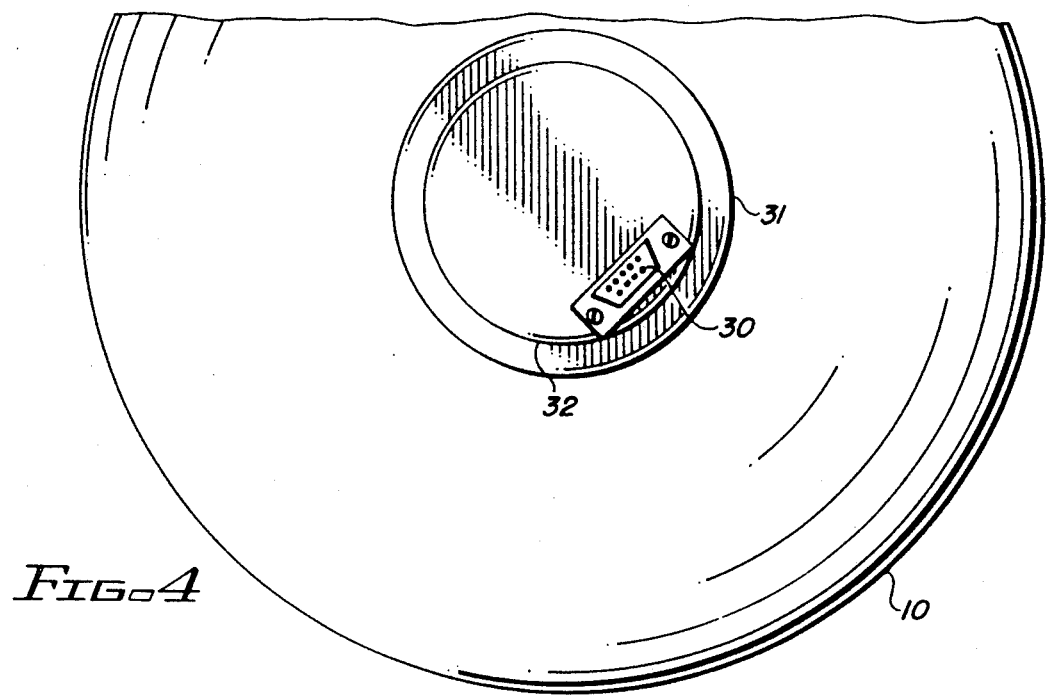
FIG. 4 is an end view of another portion of the device shown in FIGS. 1 and 2.
Figure 5:
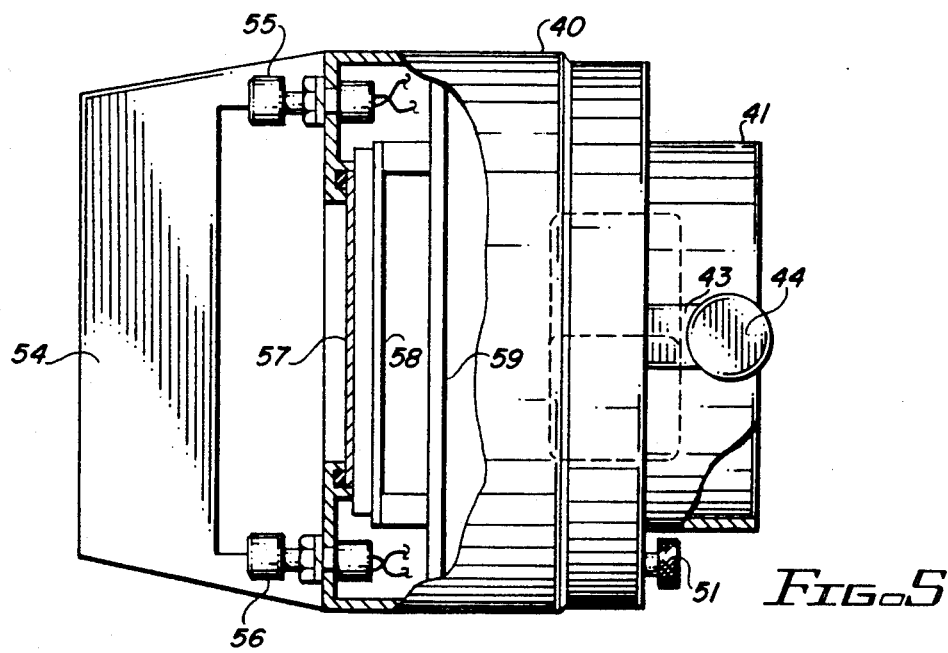
FIG. 5 is a top view of a portion of the device shown in FIGS. 1 and 2.

A second housing portion 40, which is separable from the housing 10, is removably connected to a circular extension 32 (behind a collar 31) at the left or rear of the housing 10 of the device, as shown most clearly in FIGS. 2 and 4. The connection is effected by sliding an overlying ring 41 (on the housing 40) over the extension 32, and securing the two units 10 and 40 together by means of threaded thumb screws 44 and 46, as shown most clearly in FIGS. 2 and 3. Located in alignment with the female socket 30 on the housing 10 is a male connector 50 on the housing 40 to interconnect the wiring harnesses or cables inside the two housings with one another. Thus, electrical continuity is provided between the electronic circuitry within the housing 40 to the photocells in the housing 10 when the two housings are connected together, as shown in FIG. 2.

The housing 40 has a handle 54 located on its left hand end, as viewed in FIGS. 1 and 2. Directly above the handle is a display window 57, which is used to display digital indicia formed on an LED or LCD display 58 located directly behind the window 57. Signals for the display 58 are supplied by circuitry placed on a circuit board 59. The viewing angle of the display screen 58 can be adjusted using knob 51 located on the rear of the housing 40.

Power for operating the circuitry within the housing 40 is supplied by a rechargeable battery (not shown). A charging jack 98 is provided on the rear of the housing 40 for this purpose. The actual circuitry on the circuit board 59, and the interconnections between the different wiring harnesses, have not been shown, since conventional techniques are used to effect this. To illustrate, physically, these wiring connections would unreasonably clutter the drawing.

Located immediately above the handle 54 are two push-button switches 55 and 56. The switch 56 is a main power on-off switch, which is depressed to turn the power on whenever the device is to be used. When readings are to be taken, the switch 55 is depressed, and the information resulting from the readings then is displayed by the LED display 58 through the window 57. The nature of the display can be varied in accordance with the desires of persons operating the system. For example, it can be simply a pass/fail indication, or actual numerical data may be provided.

Figure 6:
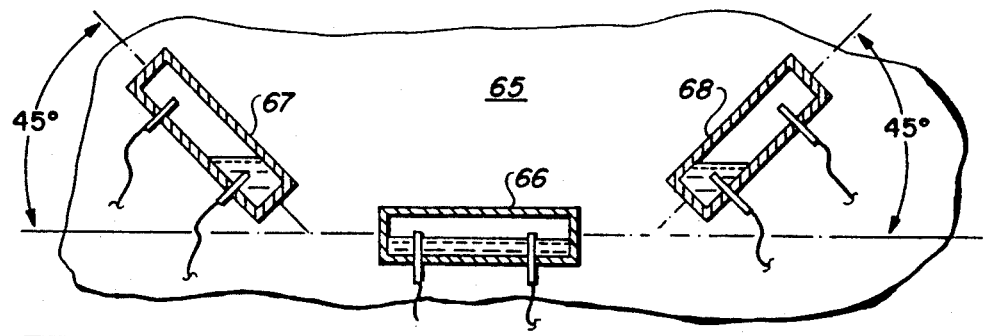
FIG. 6 is a diagrammatic representation of an angle orientation switch array used with the embodiment shown in FIGS. 1 through 5.

To be certain that the readings are taken with proper orientation of the housing 10 to the traffic signal light, so that no erroneous information is indicated by the display through the window 57, an angle orientation module 65 is located inside the housing 40 near the bottom. The device 65 includes three mercury switches 66, 67 and 68, with the switch 66 located to be closed or rendered conductive when the handle 54 (and therefore, the entire device including the housings 10 and 40) is oriented horizontally. The switches 67 and 68 are open in this position (shown in FIG. 6). Similarly, the switch 67 is closed, and the switches 66 and 68 are open, when the handle 54 is rotated counter-clockwise 45° from horizontal. On the other hand, the switch 68 is closed, and the switches 66 and 67 are open, when the handle 54 is rotated 45° clockwise from the horizontal position. When any one of the three switches 66, 67, and 68 is closed, readings can be obtained from the device and displayed through the display window 57.

The two opposite 45° angles, for providing output signals from the device as it is rotated 45° in each direction from horizontal, are employed to provide enough data to indicate whether or not the signal passed or failed the ITE measurement points, and to indicate whether there is movement of the lamp off the optical axis of the fixture, and if so, in what direction. The three measurement points which are established by the mercury switches 66, 67 and 68 provide this basis. Although mercury switches have been shown for the angle orientation device 65, other orientation sensitive switches may be employed, if desired.

As illustrated in FIGS. 1 through 5, the housing 40, which includes all of the electronic circuitry and operating power for the device, is shown as connected to the rear of the front detector housing 10, designed to test 8" traffic signals. If a 12" traffic signal light is to be tested, a different housing 10 is interconnected with the housing 40. Structurally, the housings 10 for either 8" or 12" testing are identical, except for size. The circular opening 13 for a device designed to test a 12" signal is 12". On the rear of the housing 10, however, the shoulder 31 and the projection 32 have the same external diameters, irrespective of which size traffic signal light is being tested. Thus, the housing 40 is connected to the front housings 10 in the same manner. For a 12" signal, however, an electrical signal is connected to a designated pin on the connector 30 from the connector 50 and back through a designated pin on the connector 30 to a designated pin on the connector 50 to indicate that the housing 40 is connected to a 12" test device. When the housing 40 is connected to an 8" device, as shown in FIGS. 1 and 2, such an electrical connection is absent, and no signal is returned to the housing 40. This provides an automatic indication to the circuitry located within the housing 40 of the type of traffic signal light which is undergoing test since, obviously, the light intensities from a 12" traffic signal light are greater than those for an 8" light. This information is utilized to provide proper comparison control signals to the circuitry located within the housing 40.

Figure 7:
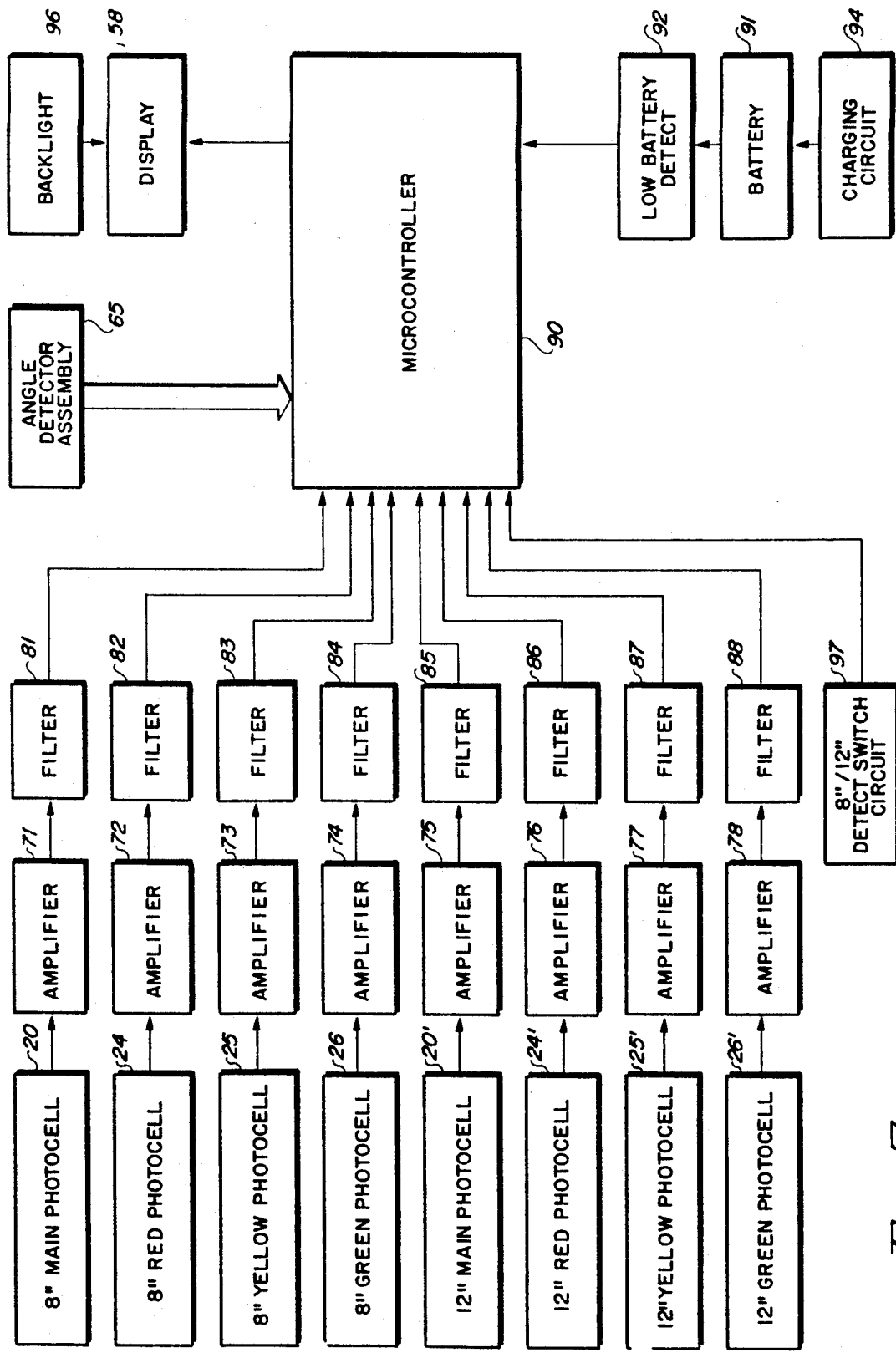
FIG. 7 is a block circuit diagram of the system employed in the embodiment shown in FIGS. 1 through 6.

The circuit of FIG. 7 comprises the electronic circuitry located within the housing 40, and mounted on the circuit board 59. The heart of this circuit is a microcontroller 90. A memory in the microcontroller 90 is provided with stored data indicative of acceptable signal light intensity ranges at the three different angles indicated by the angle detector assembly 65, including the switches 66, 67, and 68, for comparison with the light intensity signals coupled at those angles supplied by the photocell 20.

As shown in FIG. 7, an 8/12 detection circuit 97 provides a signal to the microcontroller 90; so that it operates with either the 8" set of inputs or the 12" set of inputs. Only one of these sets of inputs is enabled in accordance with the operating condition of the switch circuit 97. If an 8" traffic signal light is being tested, signals are supplied from the main photocell 20 and a selected one (at any given time) of the photocells 24, 25, or 26. The signals from those photocells are amplified, respectively, by amplifiers 71 through 74, the outputs of which are supplied through filters 81 through 84 to produce the inputs to the microcontroller 90 for comparison with the stored values.

The outputs of the main photocell 20 and the selected ones of the color photocells 24 to 26 then are employed within the microcontroller 90 as inputs to comparator circuits, the other inputs of which are selected (in accordance with the condition of the switch circuit 97 and the angle detector assembly switches 65) from stored ideal values to determine whether the actual measured signals are within acceptable specified ranges. That information then is supplied from the microcontroller 90 to the display 58, which may be provided with a back light 96, if desired.

As illustrated in FIG. 7, a battery 91 is also shown as operating power to the microcontroller 90 through a low battery detect circuit 92. Consequently, if the power from the battery 91 falls below a value capable of accurate operation of the system, a signal will be provided by the low battery detect circuit 92, either to disable the display completely, or to warn the user that battery power is low. A charging circuit 94, conventional in form, is provided to recharge the battery 91 through the charge jack 98 located on the rear of the housing 40.

If the system is operated to test a 12" traffic signal light, the operation of the circuit 97 indicates that to the microcontroller 90; and photocells 20', and 24' through 26' provide the input signals in place of the photocells 20 and 24 through 26, discussed previously. Amplifiers 75 through 78 and filters 85 through 88, respectively, are connected to the photocells 20' and 24' through 26' in the same manner described above for the 8" detection circuit. Different sets of comparison values are stored in the microcontroller 90 for 12" traffic signal lights, but the operation of the system is the same as described previously for 8" traffic signal lights. The display is effected on the display 58 in the same manner as for an 8" light.

To operate the device, the open end 13 of the unit is placed over the traffic signal light to be tested. Automatic selection of the color of the signal light is effected by the photo detector cells 24, 25, and 26 (or 24', 25' and 26'), so that the proper data is fed to the microcontroller 90 for comparison therein. Once the unit is in place, the test or read button 55 is depressed and held while the unit is rotated through the different angles of the angle detector assembly 65. As each of the switches 66, 67, and 68 are closed, automatic readings at those correct angles of measurement are provided in the display window 57. Typically, the readings are displayed as P (pass), −(low), or +(high). The other two signal colors of the traffic signal light are tested in the same manner. As mentioned previously, actual numerical output readings also can be provided; but the simple "pass" and "fail" indications mentioned here will be found to be satisfactory for most applications. A P (pass) indication means that the signal meets or surpasses a stored specification at the measurement angle. A −(low) indication means that the signal output does not meet specification at the angle measured. A +(high) indication (available only when testing 8" signal sizes) indicates that the signal output far exceeds the stored specification. This generally means that an improper wattage lamp has been installed.

The device which is shown in the drawings, and which has been described above, is capable of providing fast and accurate measurements of the actual performance of traffic signal lights at their operating locations. The device is lightweight and portable, and is easy to use. It should be understood, however, that the device which has been shown and described is to be considered illustrative of the invention only, and not as limiting. For example, various changes and modifications will occur to those skilled in the art, without departing from the true scope of the invention as defined in the appended claims.

We claim:

1. A traffic signal photometer for measuring the intensity of light emanating from the lens of a traffic signal light, including in combination:
    a housing member having a front opening for engagement with the lens of a traffic signal light to permit light emanating from the traffic signal light to enter said housing member;
    directional optical filter means in said housing member for allowing only the passage of light rays emitted from the lens of a traffic signal light at a predetermined angle to pass therethrough;
    means for receiving light passing through said directional optical filter means for producing an output signal proportional to the intensity of such received light rays;
    output signal utilization means responsive to said output signal; and
    orientation switch means on said housing member for enabling said output signal utilization means only when said housing member has a predetermined orientation.

2. The combination according to claim 1 further including color sensing means coupled with said utilization means and responsive to light emanating from said traffic signal light for producing a signal indicative of the color of such light.

3. The combination according to claim 2 wherein said output signal utilization means is responsive to said output signal, and said signal is indicative of the color of said light rays for producing an output indicative of the intensity of light at a predetermined color.

4. The combination according to claim 3 wherein said optical filter means comprises an elongated honeycomb filter extending along a predetermined portion of the length of said housing member, and physically mounted within said housing member at said predetermined angle.

5. The combination according to claim 4 wherein said means for receiving light passing through said optical filter means comprises first photocell means for producing said output signal, and further includes means for directing light passing through said optical filter means onto said first photocell means.

6. The combination according to claim 5 wherein said utilization means includes display means responsive to said output signal for producing an output indicative of said signal intensity.

7. The combination according to claim 6 further including first manually operated switch means for selectively enabling said display means for operation, and further wherein said orientation switch means interconnects said output signal with said display means only when said housing member has a predetermined orientation.

8. The combination according to claim 7 wherein said color sensing means comprises means responding to each of a plurality of different colors for producing signals indicative of the color of received light.

9. The combination according to claim 8 wherein said orientation switch means comprises at least first and second orientation switches for interconnecting said output signal with said display means in either of two rotational positions of said housing member located a predetermined number of degrees apart.

10. The combination according to claim 7 wherein said predetermined number of degrees is 45°.

11. The combination according to claim 10 wherein said traffic signal photometer is a portable device.

12. The combination according to claim 1 wherein said utilization means includes display means responsive to said output signal for producing an output indicative of said signal intensity.

13. The combination according to claim 12 wherein said orientation switch means comprises at least first and second orientation switches for interconnecting said output signal with said display means in either of two rotational positions of said housing member located a predetermined number of degrees apart.

14. The combination according to claim 13 wherein said predetermined number of degrees is 45°.

15. The combination according to claim 12 further including first manually operated switch means for selectively enabling said display means for operation, and further wherein said orientation switch means interconnects said output signal with said display means only when said housing member has a predetermined orientation.

16. The combination according to claim 1 wherein said optical filter means comprises an elongated honeycomb filter extending along a predetermined portion of the length of said housing member, and physically mounted within said housing member at said predetermined angle.

17. The combination according to claim 16 wherein said means for receiving light passing through said optical filter means comprises first photocell means for producing said output signal, and further includes means for directing light passing through said optical filter means onto said first photocell means.

18. The combination according to claim 1 wherein said traffic signal photometer is a portable device.

19. The combination according to claim 1 wherein said means for receiving light passing through said optical filter means comprises first photocell means for producing said output signal, and further includes means for directing light passing through said optical filter means onto said first photocell means.

* * * * *